United States Patent
Jia

(10) Patent No.: US 7,146,055 B2
(45) Date of Patent: Dec. 5, 2006

(54) IMAGE PROCESSING DECOMPRESSION APPARATUS AND METHOD OF USING SAME DIFFERENT SCALING ALGORITHMS SIMULTANEOUSLY

(75) Inventor: Charles Chi Jia, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 239 days.

(21) Appl. No.: 10/901,647

(22) Filed: Jul. 28, 2004

(65) Prior Publication Data

US 2004/0264787 A1   Dec. 30, 2004

(51) Int. Cl.
G06K 9/36 (2006.01)

(52) U.S. Cl. .................................. 382/233; 382/166

(58) Field of Classification Search ............... 382/233, 382/166, 167, 254, 263, 264, 274, 298, 299, 382/300; 375/240.25, 240.29; 345/604, 345/607, 611, 127, 154
See application file for complete search history.

(56) References Cited

U.S. PATENT DOCUMENTS

| | | | |
|---|---|---|---|
| 3,931,637 A | 1/1976 | Carpenter | |
| 5,467,413 A | 11/1995 | Barrett | |
| 5,574,572 A | 11/1996 | Malinowski et al. | |
| 5,668,646 A | 9/1997 | Katayama et al. | |
| 5,684,544 A | 11/1997 | Astle | |
| 5,691,746 A | 11/1997 | Shyu | |
| 5,784,047 A | 7/1998 | Cahill et al. | |
| 5,844,541 A | 12/1998 | Cahill | |
| 6,014,467 A | 1/2000 | Asano | |
| 6,014,468 A | 1/2000 | McCarthy et al. | |
| 6,020,920 A | 2/2000 | Anderson | |
| 6,020,975 A | 2/2000 | Chen et al. | |
| 6,021,225 A | 2/2000 | Ishikawa | |
| 6,043,845 A * | 3/2000 | Thompson | 375/240.01 |
| 6,389,174 B1 | 5/2002 | Liu et al. | |
| 6,404,918 B1 | 6/2002 | Hel-or et al. | |
| 2002/0141652 A1 | 10/2002 | Charrier et al. | |

OTHER PUBLICATIONS

Society for Information Display Symposium, San Diego, 1996 and article entitled A spatial extension of CIELAB for digital color image reproduction.
"Perceptual Steps Along Color Scales" by Haim Levowitz, Institute for Visualization and Perception Research, 1996.
"Uniform Color Space As A Function of Spartial Frequency", SPIE 1913, p. 449-461 (1993) by E. M. Granger (Copy Abstract attached), p. 19 of 28.
Eric Hamilton, JPEG File Interchange Format, Version 1.02, C-Cube Microsystems, Milpitis, CA pp. 1-8 (1992).

(Continued)

*Primary Examiner*—Yon J. Couso
(74) *Attorney, Agent, or Firm*—Jerry Potts

(57) ABSTRACT

An image processing apparatus and method includes a sub-sampler decompression unit that takes an inverse transformation to rebuild 411 sub sampled luminance/chrominance color space components which are than transformed into full resolution luminance/chrominance color space pixel data. The luminance/chrominance color space pixel data is then separated into individual luminosity and chromaticity components which are scaled. A scaling unit responsive to the sub-sampler decompression unit applies different processing algorithms to the various ones of the luminance and chrominance components to scale the main luminosity component utilizing a spacial algorithm while simultaneously scaling the minor chromaticity components utilizing a perceptual algorithm. The scaled full resolution luminance and chrominance color space components are then converted into RGB color space for display purposes.

13 Claims, 2 Drawing Sheets

OTHER PUBLICATIONS

Jerzy Karczmarczuk <karczma@info.unicaen.fr> JPEG Compression, http://www.tug.org/listsArchives/pdftex/msg03068.html (discussion thread Jul. 10, 1998) p. 1.

Ray Wolfgang, JPEG Tutorial, http://www.ece.purdue.edu/jpeg-tut/jpegtut1.html pp. 1-2, Feb. 10, 2000.

JPEG's Compression Technique, http://www.ece.purdue.edu/ace/jpeg-tut/jpgcmpr1.html p. 1, Feb. 10, 2000.

[75] Introduction to JPEG http://www.faqs.org/faqs/compression-faq/part2/section-6.html pp. 1-2, Feb. 10, 2000.

JPEG's Quantizing Scheme, http://www.ece.purdue.edu/ace/jpeg-tut/jpgquan1.html p. 1, Feb. 10, 2000.

The Discrete Cosine Transform, http://www.ece.purdue.edu/ace/jpeg-tut/jpgdct1.html p. 1, Feb. 10, 2000.

JPEG Image Compression FAQ, Part 1, http://www.faqs.org/faqs/jpeg-faq/part 1 pp. 2-17, Feb. 10, 2000.

JPEG Image Compression FAQ, Part 2, http://www.faqs.org/faqs/jpeg-faq/part2 pp. 1-14, Feb. 10, 2000.

comp.compression FAQs, Part 1, 2 and 3 http://faqs.org/faqs/compression-faq/part1/preamble.html, Feb. 10, 2000.

* cited by examiner

IMAGE PROCESSING DECOMPRESSION APPARATUS AND METHOD OF USING SAME DIFFERENT SCALING ALGORITHMS SIMULTANEOUSLY

TECHNICAL FIELD

The present invention relates to an apparatus and method for decompressing a digitized still image, and more particularly to an apparatus and method of image processing on data in $Y\ C_b\ C_r$ space before converting into RGB format.

BACKGROUND OF THE INVENTION

JPEG is an image compression standard developed by the Joint Photographic Experts Group for communicating digitized still images from one operating platform to another. More particularly when an image is to be digitized and recorded on a recording media, such as the hard drive of a computer, the image data become enormous. Thus, in order to conserve on the amount of required storage space most if not all digital images are first compressed before storage. JPEG compression is the leading standard for digitized still images.

The baseline JPEG compression algorithm begins by transforming an image to be stored into an appropriate color space. For example, a digital camera captures light that is indicative of a scene and then causes the captured light to be converted into a digital signal which is subsequently stored on a flash memory card or the like. In this regard, the image is typically first transformed from RGB color space into a luminance/chrominance color ($Y\ C_b\ C_r$) space. The reason for such a conversion is that loss of chrominance components is not nearly as critical as loss of the luminance component since the human eye is not as sensitive to high-frequency chroma information as it is to high-frequency luminance information. Next, the components are down sampled by averaging together groups of pixels. The luminance component is generally held at its full resolution, while the chroma components are reduced 2:1 horizontally and 2:1 or 1:1 (no change) vertically. This down sampling is sometimes called "411" sampling which immediately reduces the data volume by about one-half to about one-third. The data reduction process has little or no effect on the quality of the image since the human eye is unable to process chroma information in a highly effective manner.

The next step in the compression process is to divide or group the image into 8 by 8 pixel block values and then transform each 8×8 block through a discrete cosine transformation (DCT). This transformation provides a frequency map for the various ones of the components allowing the higher frequency component values to be eliminated without affecting the low-frequency information. Next a quantizer rounds off the DCT coefficients according to a quantization matrix. That is, in each block the sixty four frequency components are divided by separate quantization coefficients, and then rounded to the nearest integer. While this step produces the "Lossy" nature of JPEG, the process nevertheless allows for large compression ratios. This quantizing process typically utilizes simple linear scaling and achieve satisfactory results.

The reduced coefficients are then encoded using Huffman coding to provide a binary output data stream which is stored on the available storage medium.

Decompression is a reverse process of compression. That is, JPEG recovers the quantized DCT coefficients from the compressed data stream, takes an inverse transform, and then converts the resulting color space components of luminance and chrominance into RGB color space for display purposes or into CYMK color space from printing purposes.

While such JPEG compression and decompression techniques have been satisfactory for most image storage and output purposes it would be highly desirable to have a new and improved image processing apparatus and method that achieves better image quality and performance results.

SUMMARY OF THE INVENTION

An image processing apparatus and method includes a sub-sampler decompression unit that takes an inverse transformation to rebuild 411 sub sampled compressed luminance/chrominance color space components which are than transformed into full resolution luminance/chrominance color space pixel data. The luminance/chrominance color space data is then separated into individual luminosity and chromaticity components that are processed according to a scaling unit and a set of other image processing units. A scaling unit responsive to the sub-sampler decompression unit applies different processing algorithms to the various ones of the luminance and chrominance components to scale the main luminosity component utilizing a spacial algorithm while simultaneously scaling the minor chromaticity components utilizing a perceptual algorithm. The scaled full resolution luminance and chrominance color space components are then converted into RGB color space for display purposes.

BRIEF DESCRIPTION OF THE DRAWINGS

The above mentioned features of the present invention and the manner of attaining them will become apparent and the invention itself will be best understood by reference to the following description of the preferred embodiment of the invention, in conjunction with the accompanying drawings, wherein.

DETAILED DESCRIPTION OF THE PREFERRED EMBODIMENT

Figure 1:
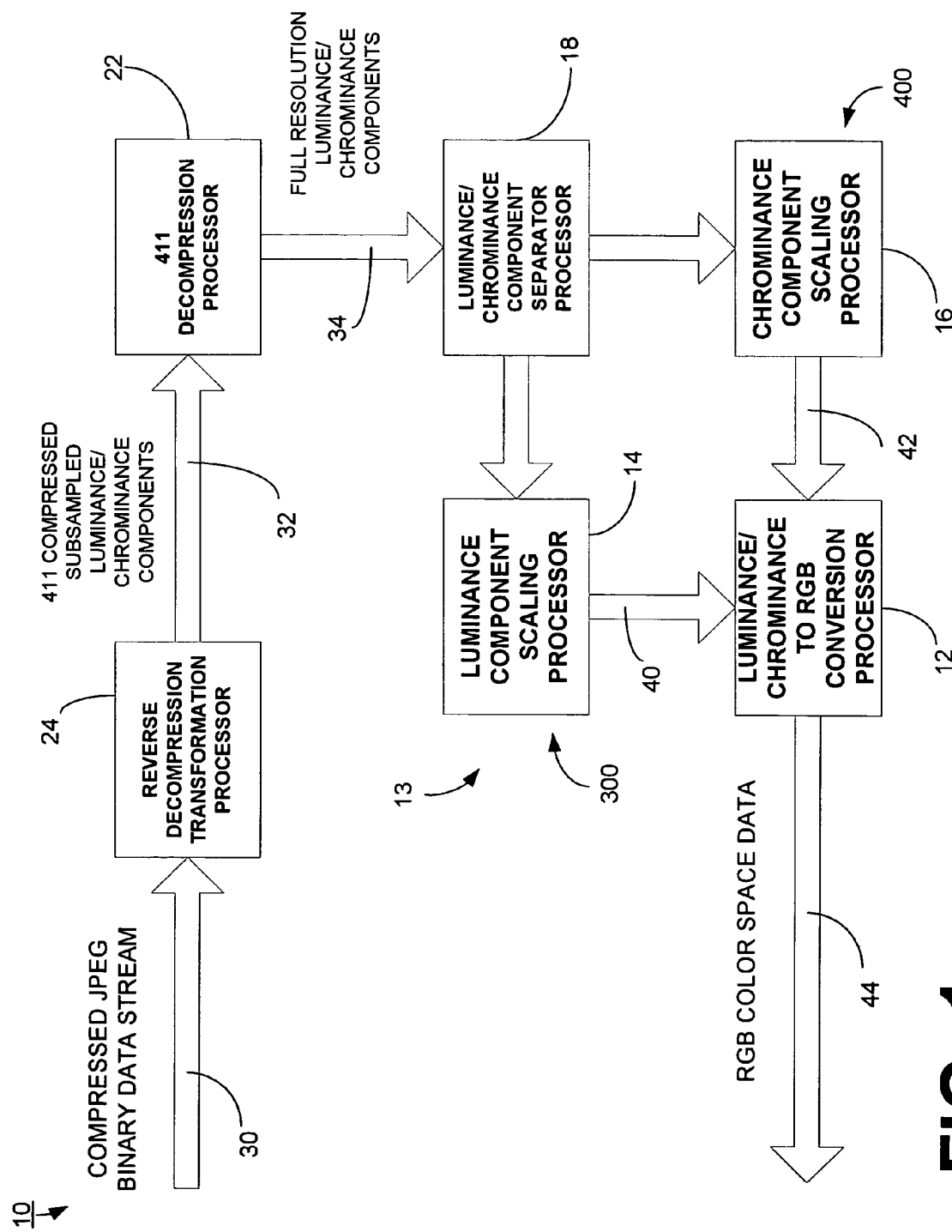
FIG. 1 is a conceptual block diagram of an illustrative data decompression system which is constructed in accordance with the present invention.

Referring now to the drawings and more particularly to FIG. 1 thereof, there is shown a image processing apparatus 10 which is constructed in accordance with the present invention. The image processing apparatus 10 employs a decompression process 200 (FIG.2) as will be explained hereinafter in greater detail, decompressed to transform a JPEG compressed binary data stream 30 to provide image data 44 indicative of full color images in RGB color space. Although in the preferred embodiment image data 44 indicative of full color images in RGB color space is provided, those skilled in the art will appreciate that conversion of the JPEG compressed binary data stream 30 can result in full color images in other color space parameters, such as CYM color space parameters. There is therefore no intention of limiting the present invention to providing only full color image data in RGB color space.

Considering now the image processing apparatus 10 in greater detail with reference to FIG. 1, the image processing apparatus 10 generally comprises a color space converter 12 and a scaling unit 13. The color space converter 12 transforms processed luminance (Y) and chrominance (Cb Cr) color space components processed by the scaling unit 13 into RGB color space components. More particularly, in the decompression process 200 at step 214, Y Cb Cr (265 levels) is converted to RGB color space utilizing equations 1–3 as indicated below:

$$R = Y + 1.402(C_r - 128) \quad \text{Equation 1}$$

$$G = Y - 0.34414(C_b - 128) - 0.71414(C_r - 128) \quad \text{Equation 2}$$

$$B = Y + 1.772(C_b - 128) \quad \text{Equation 3}$$

Considering now the scaling unit 13 in greater detail with reference to FIG. 1, the scaling unit 13 generally includes a luminance component scaling processor 14 and a chrominance scaling processor 16 for providing the processed luminance (Y) and chrominance (Cb Cr) color space components to the color space converter 12. More particularly, in order to provide a stream of full resolution luminance color space components 40 and a corresponding stream of full resolution chrominance color space components 42 to the converter 12, the image processing apparatus 10 also includes the luminance component scaling processor 14 and the chrominance component scaling processor 16. The scaling processors 14 and 16 operate simultaneously, during the decompression process 200 at steps 210 and 212, on the respective separated luminance and chrominance color space components by applying different scaling algorithms. In this regard, the luminance component scaling processor 14, responds to a luminance/chrominance component separator processor 18 (FIG. 1), which separates the full resolution luminance and chrominance color space components 34 at step 206, and applies a spacial algorithm 300 (FIG. 3) to the luminosity Y components, while the chrominance component scaling processor 16, in response to the luminance/chrominance component separator processor 18 determining at step 208 the presence of chrominance component, applies a perceptual algorithm 400 (FIG. 4) to the chromaticity (Cb Cr) color space components. The different ones of the scaling algorithms 300 and 400 will be described hereinafter in greater detail.

The individual full resolution luminance and chrominance color space components are derived or rebuilt during the decompression process 200 at step 204, from a 411 subsampled compressed luminance/chrominance data stream 32 via a 411 decompression processor 22, which initiates the decompression process 200 at a start step 200. In the compression mode, subsampled components are averaged together in groups of pixels where the luminance component is left at full resolution, while the chroma components are reduced horizontally by 2:1 and vertically by either 2:1 or by 1:1 which is no reduction whatsoever. In JPEG compression terminology such alternative are typically called 2h2v or 422 sampling and 2h1v or 411 sampling. The 411 decompression processor 22 reverses this process by converting the 2h1v sampling to a full resolution sampling of full resolution luminance and chrominance color space components.

In order to provide the 2h1v sampling to the 411 decompression processor 22, the image processing apparatus 10 further includes a reverse decompression transformation processor 24 that is coupled between the incoming compressed JPEG binary data stream 30 and the 411 decompression processor 22. The reverse decompression transformation processor 24 multiples the reduced coefficients by quantization table entries to produce approximate DCT coefficients. It should be noted by those skilled in the art that since only approximate DCT coefficients are provided, the reconstructed pixel values are also approximate but substantially undetectable to the human eye since the transformation processor 24 add some smoothing steps to reduce pixel-to-pixel discontinuities.

The 411 decompression processor 22 is enhanced to use a unique plan adjusting technique. That is, with 411 sub sampling, the $C_b$, $C_r$ components of four pixels are averaged, possibly yielding values outside of the possible range when these values are reconstructed, the range of possible $C_b$, $C_r$ values are checked for the corresponding Y value, and mapped in range if necessary. This adjustment technique is executed for all 4 pixels as a group. A greedy algorithm is utilized for this adjustment expressed as follows:

1 2

3 4

In this regard, the four pixels are checked in the order indicated so that if any pixel has a value out of range, the value of that pixel is adjusted by mapping in range, the difference being dispersed into the opposite diagonally aligned pixel.

Figure 2:
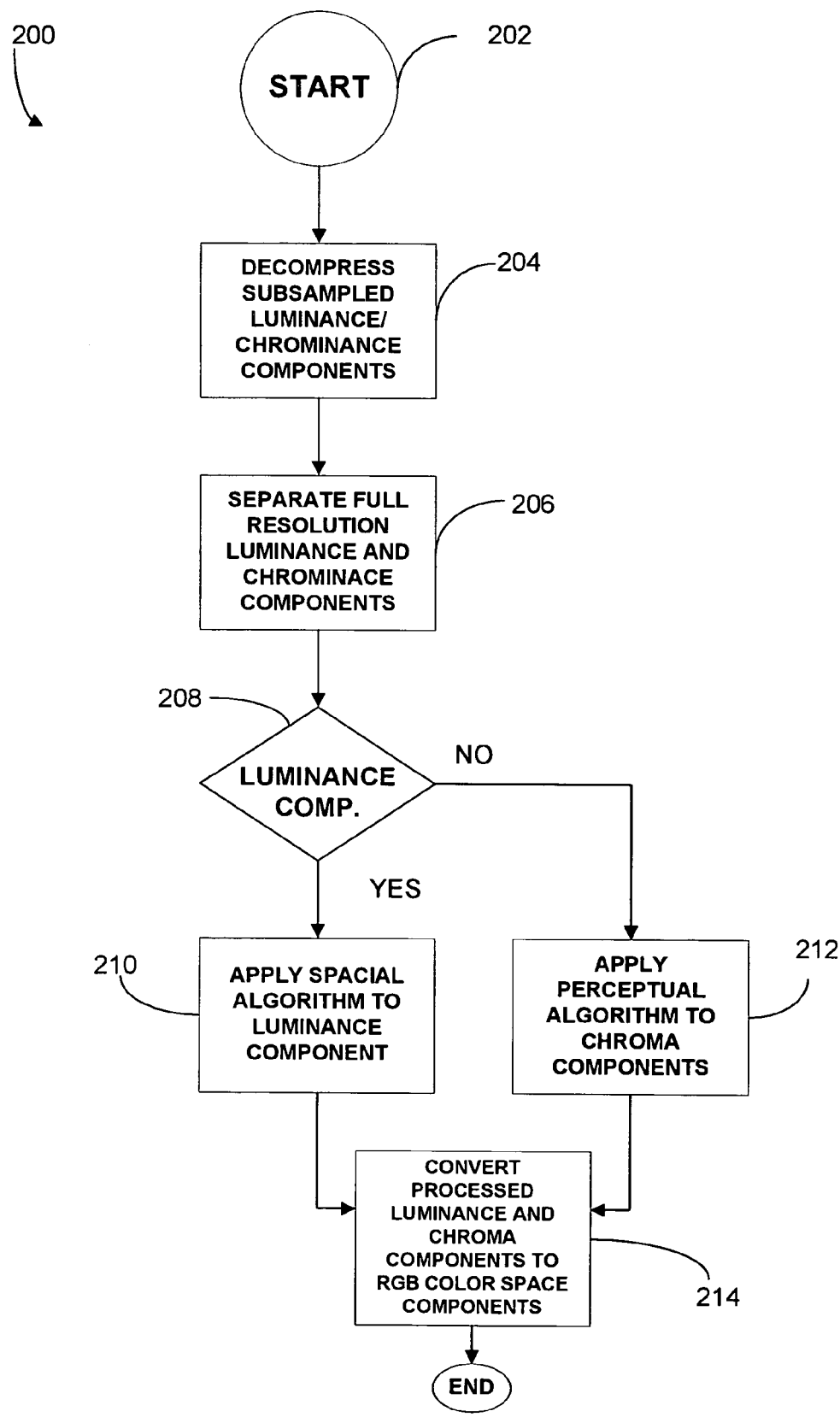
FIG. 2 is a flowchart illustrating a series of steps for decompressing a compressed color space data stream in accordance with a decompression method of the present invention.

Considering now the spacial algorithm step 210 in greater detail with reference to FIG. 2, the spacial algorithm step 210 is performed in a conventional manner, well known to those skilled in the art. For the scaling process, a bi cubic or bilinear algorithm is utilized, while for sharpen, unsharpen and smoothing operations, a conventional algorithm is utilized. Such algorithms are well known to those skilled in the art and will not be described hereinafter in greater detail.

Considering now the perceptual algorithm step 212 in greater detail with reference to FIG. 2, the perceptual algorithm step 212 is performed in a conventional manner, well known to those skilled in the art. For the scaling process, bi cubic or bilinear algorithms in a polar coordinate system is utilized, while all sharpen, unsharpen and smoothing operations are skipped.

The terms and expressions herein are used as terms of description and not of limitation, and there is no intension in the use of such terms and expressions of excluding equivalents of the features and steps shown and described, or portions thereof, it being recognized that various modifications are possible within the scope of the invention claimed. Thus, modifications and variations may be made to the disclosed embodiments without departing from the subject and spirit of the invention as defined in the following claims.

I claim:

1. A data decompression apparatus, comprising:
    a decompression unit for providing separated full resolution luminance and chrominance color space components indicative of individual image pixels in a compressed color space data stream;
    a plurality of image processing units for applying a scaling process to the full resolution luminance color space components and for applying another scaling process to the individual ones of the chrominance color space components to provide decompressed full resolution luminance and chrominance color space data to facilitate image zoom operations.

2. A data decompression apparatus according to claim 1, further comprising:
    a color space conversion unit coupled to said plurality of image processing units for converting the decompressed full resolution luminance and chrominance color space data into decompressed full resolution RGB color space data to facilitate the displaying of the individual image pixels in said compressed color space data stream.

3. A data decompression method, comprising: providing separated full resolution luminance and chrominance color space components indicative of individual image pixels in a compressed color space data stream;
applying a scaling process to the full resolution luminance color space components; and
applying another scaling process to the individual ones of the chrominance color space components;
wherein full resolution decompressed luminance and chrominance color space data is provided to facilitate image zoom operations.

4. A data decompression method according to claim 3, further comprising:
converting the decompressed full resolution luminance and chrominance color space data into decompressed full resolution RGB color space data to facilitate the displaying of the individual image pixels in said compressed color space data stream.

5. A data decompression method according to claim 4, further comprising:
displaying in full resolution RGB color space the individual image pixels in said compressed color space data stream.

6. A data stream decompression system, comprising:
a color space processing unit for facilitating the conversion of a compressed luminance and chrominance color space data stream into a decompressed full resolution luminance and chrominance color space data stream;
said color space processing unit including:
a decompression unit for providing separated full color resolution luminance and chrominance color space components indicative of individual image pixels in said compressed color space data stream;
and a plurality of image scaling units for processing the full resolution luminance color space components with a scaling algorithm and for processing the full resolution chrominance color space components with another scaling algorithm.

7. A data stream decompression system according to claim 6, further comprising:
a color space conversion unit coupled to said plurality of image scaling units for converting the decompressed full resolution luminance and chrominance color space data stream into a decompressed full resolution RGB color space data stream to facilitate displaying of the individual pixels in said compressed color space data stream.

8. A data stream decompression system according to claim 6, wherein said compressed luminance and chrominance color space data stream includes compressed luminance components and uncompressed chrominance components.

9. A data stream decompression system according to claim 6, wherein said plurality of image processing units apply one type of sharpening process to the full resolution luminance color space components to provide full resolution color space components indicative of luminance components and another type of sharpening process to the individual ones of the chrominance color space components to provide other full resolution color space components indicative of chrominance components.

10. A data stream decompression system according to claim 6, wherein said plurality of image processing units apply one type of unsharpening process to the full resolution luminance color space components to provide full resolution color space components indicative of luminance components and another type of unsharpening process to the individual ones of the chrominance color space components to provide other full resolution color space components indicative of chrominance components.

11. A data stream decompression system according to claim 6, wherein said plurality of image processing units apply one type of smoothing process to the full resolution luminance color space components to provide full resolution color space components indicative of luminance components and another type of smoothing process to the individual ones of the chrominance color space components to provide other full resolution color space components indicative of chrominance components.

12. The data decompression method according to claim 3, wherein said step of applying a scaling process includes applying a spatial algorithm scaling process; and
wherein said step of applying another scaling process includes applying a perceptual algorithm scaling process.

13. The data stream decompression system according to claim 6, wherein said a scaling algorithm is a spatial scaling algorithm, and wherein said another scaling algorithm is a perceptual scaling algorithm.

* * * * *

UNITED STATES PATENT AND TRADEMARK OFFICE
CERTIFICATE OF CORRECTION

PATENT NO. : 7,146,055 B2 Page 1 of 1
APPLICATION NO. : 10/901647
DATED : December 5, 2006
INVENTOR(S) : Charles Chi Jia It is certified that error appears in the above-identified patent and that said Letters Patent is hereby corrected as shown below:

In column 1, line 62, delete "Huffinan" and insert -- Huffman --, therefor.

Signed and Sealed this

Second Day of December, 2008

JON W. DUDAS
*Director of the United States Patent and Trademark Office*